United States Patent
Genoud et al.

(10) Patent No.: US 7,596,984 B2
(45) Date of Patent: Oct. 6, 2009

(54) CALIBRATION WEIGHT ARRANGEMENT FOR AN ELECTRONIC BALANCE

(75) Inventors: Dominique Genoud, Olten (CH); Peter Schilling, Siebnen (CH); Thomas Koeppel, Oetwil am See (CH); Matthias Scheu, Uster (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/323,917

(22) Filed: Nov. 26, 2008

(65) Prior Publication Data
US 2009/0078472 A1 Mar. 26, 2009

Related U.S. Application Data

(63) Continuation of application No. PCT/EP2007/056415, filed on Jun. 27, 2007.

(30) Foreign Application Priority Data
Jun. 28, 2006 (EP) .................................. 06116246

(51) Int. Cl.
*G01G 23/01* (2006.01)
(52) U.S. Cl. ................ 73/1.13; 177/1; 73/1.15
(58) Field of Classification Search ............. 177/1, 177/50; 73/1.13, 1.15
See application file for complete search history.

(56) References Cited

U.S. PATENT DOCUMENTS

| | | | | |
|---|---|---|---|---|
| 2,969,228 A | * | 1/1961 | Appius | 177/229 |
| 4,392,487 A | * | 7/1983 | Selner et al. | 602/27 |
| 4,433,742 A | * | 2/1984 | Lee | 177/229 |
| 4,467,883 A | * | 8/1984 | Meier | 177/210 FP |
| 4,497,386 A | * | 2/1985 | Meier | 177/229 |
| 4,932,486 A | * | 6/1990 | Komoto et al. | 177/50 |
| 5,148,881 A | | 9/1992 | Leisinger | |
| 5,550,328 A | * | 8/1996 | Freeman et al. | 177/50 |
| 5,866,854 A | | 2/1999 | Emery et al. | |
| 6,194,672 B1 | * | 2/2001 | Burkhard et al. | 177/210 EM |
| 6,414,252 B1 | * | 7/2002 | Emery et al. | 177/229 |
| 7,339,122 B2 | * | 3/2008 | Burkhard | 177/1 |
| 7,395,689 B2 | * | 7/2008 | Genoud et al. | 73/1.13 |
| 7,429,705 B2 | | 9/2008 | Genoud et al. | |
| 2005/0061553 A1 | * | 3/2005 | Wang et al. | 177/1 |

FOREIGN PATENT DOCUMENTS

| | | |
|---|---|---|
| DE | 19920436 A1 | 11/2000 |
| DE | 20119525 U1 | 4/2003 |
| DE | 20318788 U1 | 5/2004 |
| WO | 01/71899 A2 | 9/2001 |

* cited by examiner

Primary Examiner—Randy W Gibson
(74) Attorney, Agent, or Firm—Standley Law Group LLP

(57) ABSTRACT

A force-measuring cell is designed for a receiving structure having multiple force-measuring cells of the same type. Each cell in the receiving structure occupies a design space whose dimensions, projected into a plane orthogonal to the load direction, is delimited by the design spaces of neighboring and/or is equal to the largest dimension of the cell in the plane. The cell has parallel-guiding diaphragms arranged on upper and lower surfaces thereof. The cell includes a calibration weight arrangement with a calibration weight which can be coupled to the cell, as well as a drive mechanism and a transfer mechanism for guidedly moving the calibration weight. An actuator works together with the transfer mechanism and a piezoelectric element that drives the actuator. The actuator has at least two interacting elements to repeatedly engage and release each other by frictional contact force which occurs during the travel movement in one direction.

20 Claims, 4 Drawing Sheets

CALIBRATION WEIGHT ARRANGEMENT FOR AN ELECTRONIC BALANCE

CROSS-REFERENCE TO RELATED APPLICATIONS

This application is a continuation under 35 USC §120 of PCT/EP2007/056415, filed 27 Jun. 2007, which is in turn entitled to benefit of a right of priority under 35 USC §119 from European patent application 06 11 6246.7, filed 28 Jun. 2006, the content of each of which is incorporated by reference as if fully recited herein.

TECHNICAL FIELD

The invention relates to a calibration weight arrangement for an electronic balance and in particular to a drive mechanism for a calibration weight arrangement.

BACKGROUND OF THE ART

Electronic balances are in many cases calibrated by means of an internal calibration weight. To perform a calibration, a calibration weight of a defined mass is brought into force-transmitting contact with the force-transmitting mechanism that is arranged in the force-measuring cell of a balance, whereupon a reference weight is determined. Based on this reference value, it is possible to adjust further weighing parameters of the balance. After the calibration has been successfully completed, the contact between the calibration weight and the force-transmitting mechanism is released again and the calibration weight is locked in a rest position. In this process, the calibration weight is moved from a rest position into a calibrating position and back by a transfer mechanism which includes at least one lifting element cooperating with a drive mechanism. In the calibrating position, the calibration weight is in force-transmitting contact with the force-transmitting device, while there is no force-transmitting contact in the rest position.

The known state of the art offers various types of lifting elements and versions of calibration weight arrangements.

A calibration weight which is disclosed in EP 0 468 159 B1 is moved vertically by pairs of wedge blocks sliding horizontally against each other and is thereby brought into force-transmitting contact with the force-transmitting device of the balance. This lifting element is driven by way of a motor and a horizontally oriented spindle which is connected to the wedge blocks.

A device described in EP 0 955 530 A1 likewise effects a vertical lifting and lowering of a calibration weight. The weight rests on a seat which is moved by an electrically driven lifting element.

An arrangement is described in DE 203 18 788 U1, where a monolithically formed calibration weight is lifted and lowered by a ramp-like lifting element, wherein the lifting element is actuated by a linear drive and performs a kind of slanted translatory movement.

In many balances, the calibration weight arrangement and the force-transmitting device are arranged behind one another, as is disclosed in EP 0 955 530 A1. However, the calibration weight can also be split up for example into two calibration weights and can be attached laterally to the force-transmitting device, like the cylindrical calibration weights disclosed in EP 0 789 232 B1. The two identical weights are arranged on two opposite sides of the force-transmitting device. Two different mechanisms for moving the calibration weights are described. In the first case, the calibration weight which is equipped with a guide pin is resting on a calibration weight seat configured as a support. To perform a calibration, the calibration weight seat which is hinged on one side is tilted, whereby the calibration weight is lowered and set onto two calibration weight carriers that are connected to the force-transmitting device and are configured as rods or levers. In a second version, the weight in its rest position is held on a calibration weight seat that is arranged between the calibration weight carriers that are connected to the force-transmitting device. To perform a calibration, the calibration weight is brought into contact with the calibration weight carriers through a vertical downward movement of the calibration weight seat.

A calibration weight arrangement is disclosed in DE 201 19 525 U1 with a lifting device for a calibration mechanism which includes two angled levers with fulcrum mounts fixed in the housing, whose vertical lever arms are coupled to each other by a horizontal slide and on whose horizontal lever arms the calibration weight is seated.

The aforementioned lifting elements are generally driven by servo motors. The disadvantage in using a servo motor is that it uses a comparatively large amount of space in the force-measuring cell of the balance, whereby the force-measuring cell as well as the balance itself is unnecessarily enlarged.

Especially in highly sensitive electronic balances, the weighing result is influenced and even changed by electrostatic charges and interactions. The servo motors which are used to drive the transfer mechanisms contain electrically non-conductive gearbox components which generate electrostatic charges through friction which occurs during operation. The resulting electrostatic fields, but also electromagnetic fields of conventional electric motors, are strong enough to influence the weighing result, in particular in balances of high sensitivity.

Almost always, the calibration weight arrangements of the known state of the art have relatively large drive mechanisms. However, the known state of the art offers more and more weighing modules containing force-measuring cells which have small dimensions especially in the directions perpendicular to the load vector. These weighing modules are used for measuring small weights that must meet relatively high accuracy requirements. They are also particularly well suited for applications where weighing modules or force-measuring cells are put together in a compound arrangement in systems for production plants, serving to determine the mass of uniform weighing objects as in the checking of small, relatively expensive parts, for example in filling and packaging machines for tablets, capsules, ampoules, etc. in the pharmaceutical industry, or in the quality control of ball bearings.

To make an improvement in the calibration weight arrangement therefore requires in particular an optimization and miniaturization of the drive source for the transfer mechanism. The drive source needs to be very small, compact and flexible to meet different application requirements.

SUMMARY

This task is solved by a force-measuring cell with a calibration weight arrangement and by a weighing device, as claimed in the accompanying claims.

A force-measuring cell is suitably designed for installation in a receiving structure with a plurality of force-measuring cells of the same type. Within the receiving structure each force-measuring cell occupies a design space whose dimensions in a plane that extends orthogonal to the direction of the load are delimited by the design spaces of neighboring force-measuring cells and/or by the largest dimension of the force-measuring cell in said plane. The force-measuring cell comprises parallel-guiding diaphragms arranged, respectively, above and below the force-measuring cell. The force-measuring cell includes a calibration weight arrangement with at least one calibration weight that can be coupled to the force-measuring cell, and it also includes a drive mechanism and a transfer mechanism for the guided movement of the calibration weight. The drive mechanism includes an actuator working together with the transfer mechanism and at least one piezoelectric element driving the actuator. The actuator has at least two elements which interact with each other through the repeated engagement and release of a frictional contact force which occurs during the travel movement in one direction.

An actuator, as the term is used in the present context, encompasses the elements of the drive mechanism which perform a movement, wherein a kinematic behavior of the desired kind and direction often occurs as a result of at least two elements working together.

A calibration weight arrangement which is equipped with a drive mechanism that includes a piezoelectric element has the advantage that only a small amount of space is required to add the drive mechanism to the calibration weight arrangement. The drive mechanism is small and compact and can therefore be placed at any desired location. As a further advantage, the accumulation of electrostatic charges in the drive mechanism or its components is avoided. The drive mechanism further has no magnetic or magnetizable components which could interfere with the operation of a force-measuring cell of a balance that operates according to the principle of electromagnetic force compensation.

The transfer mechanism of the calibration weight arrangement includes a lifting element, a seat for the calibration weight, and a guiding device. This mechanism produces a guided movement, in particular a vertical movement, of the calibration weight seat and thus also of the calibration weight itself, so that when a calibration is taking place, the calibration weight can be brought into force-transmitting contact with the force-transmitting device of the force-measuring cell of a balance. After the calibration has been successfully completed, this force-transmitting contact has to be released again and the transfer mechanism needs to be returned to its rest position. This task is solved through the especially advantageous way in which the drive mechanism works, as the direction of movement is reversible with this kind of drive mechanism, which means that the upward and downward movements are accomplished with the same elements.

This drive mechanism has the further advantage that it is easy to realize a desired velocity profile in controlling the movement of a calibration weight that is to be brought into or returned from its calibrating position by means of the transfer mechanism. It is advantageous if the handing-over of a calibration weight, i.e. that phase where it comes into force-transmitting contact with the force-transmitting device, is performed with the slowest possible speed in order to avoid shocks as much as possible and further to allow the calibration weight to seat itself precisely on the calibration weight carrier that is connected to the force-transmitting mechanism.

As a further distinctive trait, due to the self-locking nature of the drive mechanism, the calibration weight seat which is in most cases movable in the vertical direction is immobilized when there is no current flowing in the drive mechanism.

In an advantageous embodiment of the calibration weight arrangement, the drive mechanism is equipped with a linear piezoelectric motor which has at least one piezoelectric element and a traveler element. The calibration weigh seat can be arranged directly on the traveler element of the linear motor, or the propulsive force of the linear motor can act on the calibration weight seat through an interposed direction-changing element, for example a lever.

According to a further possible embodiment of the calibration weight arrangement, the drive mechanism includes a rotary piezoelectric motor, in particular a traveling wave motor or a motor with a ring-shaped piezo element, which has a shaft on which the lifting element performs a vertical movement by means of a spindle that is an integral part of the shaft.

In a further development of the subject of the invention, the drive mechanism can be equipped to perform a sensor function to monitor the proper functioning of the transfer mechanism. The monitoring of the current for activating the piezoelectric element or of the inductivity of the feedback loop can be used for example to determine the position of the lifting element and the calibration weight.

In a preferred embodiment, the piezoelectric element of the drive mechanism of the calibration weight arrangement has a pusher finger that moves along an elliptical path, wherein the finger in the course of this movement can periodically come into contact, i.e. enter into a frictional or form-fitting engagement, with a drive wheel. A piezoelectric drive of this kind is disclosed for example in WO 01/71899. The pusher finger sets the drive wheel as well as a shaft with an external thread into rotation, while a guide platform with an internal thread is arranged to move along the shaft. However, in performing its elliptical movement, the pusher finger can also act directly on the lifting element or on the calibration weight seat, advancing the latter directly through periodic frictional contact or form-fitting engagement.

Embodiments of the broadest variety are conceivable for the lifting element of a calibration weight arrangement. As an example, the lifting element of the transfer mechanism can be configured as an eccentric or as a pair of wedges that move in opposition to each other. The lifting element of the transfer mechanism can also be realized in the form of at least one knee lever element.

Due to the undesirable heat generation of the drive source, the latter is arranged in a recess in the base plate on which the force-transmitting device is mounted. The base plate can have a reduced thickness in the area of the recess where an opening can be arranged for the passage of at least a part of the lifting element, for example for a shaft which can be constrained by a bearing in the opening. Thus, the excess heat is carried away through the base plate and possibly through the housing.

Due to their small spatial requirements, drive mechanisms containing a piezoelectric element are particularly well suited for use in a calibration weight arrangement of weighing modules, more specifically force-measuring cells of small dimensions primarily in the directions perpendicular to the load. When these drive mechanisms are used in a compound of weighing modules of the same type, they drive the lifting elements in the transfer mechanisms of the respective calibration weight arrangements of individual force-measuring cells. In such a compound, the force-transmitting mechanism of each force-measuring cell is coupled individually to an associated calibration weight. This is particularly useful if not all of the force-measuring cells of the compound system of weighing modules need to be calibrated, but only individual ones among them. A weighing device of this kind has at least two force-measuring cells or weighing modules. However, more typically there are several, for example four, six, eight, nine or even more force-measuring cells arranged in a two-dimensional matrix for the purpose of weighing objects of a uniform nature.

In a particularly advantageous embodiment, the drive mechanism and the transfer mechanism are arranged within the design space below or above the force-measuring cell to which they belong.

In a compound system of weighing modules, a drive mechanism with a piezoelectric element could of course be used to simultaneously couple several calibration weights to the respective force-measuring cells of at least two weighing modules as well as to subsequently uncouple the calibration weights. The compound system of weighing modules contains at least one transfer mechanism and for each weighing module at least one calibration weight which can be coupled to and uncoupled from the calibration weight carrier of the respective weighing module. The at least one transfer mechanism has calibration weight seats that are connected to each other for the respective calibration weights of at least two weighing modules.

Calibration weight arrangements can be realized whereby one or more calibration weights can be coupled to a force-transmitting mechanism by means of a transfer mechanism. An embodiment where a plurality of calibration weights are added one after another to the force-transmitting mechanism and taken off again is especially well suited to determine the linearity.

BRIEF DESCRIPTION OF THE DRAWINGS

The layout of a calibration arrangement in relation to a force-transmitting device of an electronic balance as well as a preferred embodiment of the calibration weight arrangement are shown in the drawings which are described in the following and wherein.

DETAILED DESCRIPTION

Due to their small spatial requirements, drive mechanisms containing a piezoelectric element are particularly well suited for use in a calibration weight arrangement of weighing modules that have force-measuring cells with small dimensions in the directions perpendicular to the load. For example in a compound of weighing modules, these drive mechanisms drive the lifting elements in the transfer mechanisms of the respective calibration weight arrangements of individual force-measuring cells. In such a compound, the force-transmitting mechanism of each force-measuring cell is coupled individually to an associated calibration weight. An example for arranging such small-dimensioned force-measuring cells in a compound is illustrated through the embodiment shown in FIG. 1 and described in the following.

Figure 1:
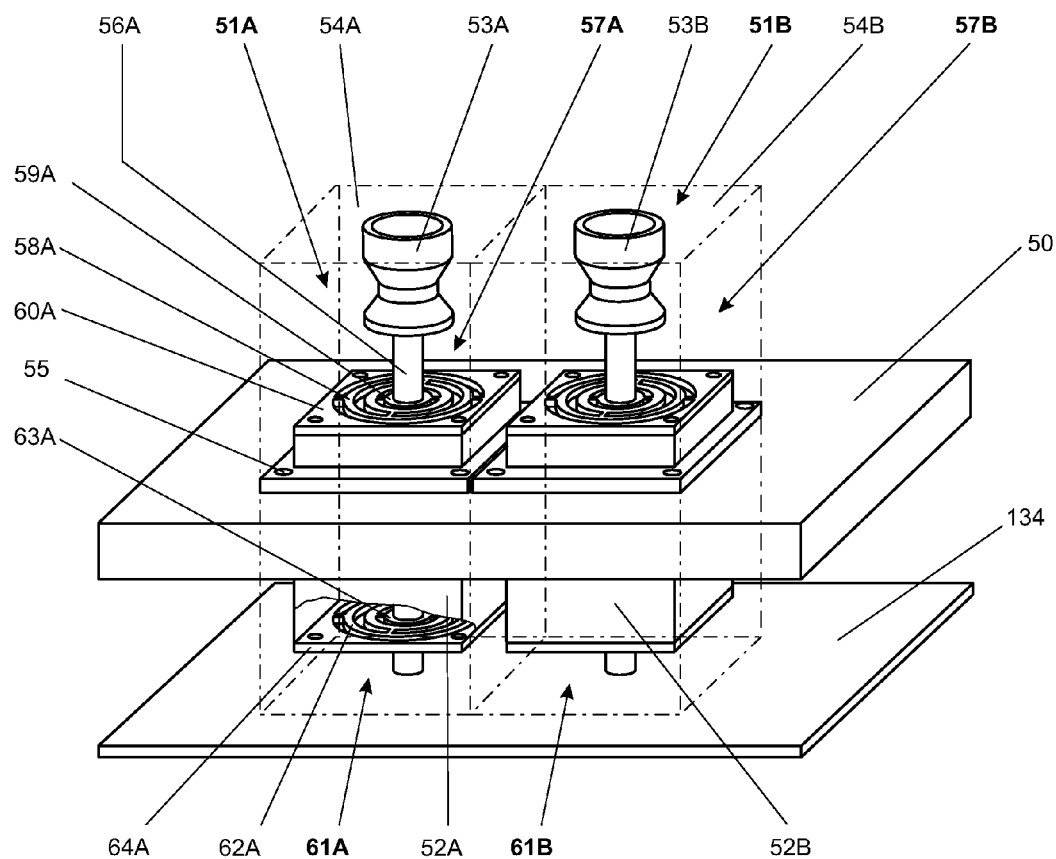
FIG. 1 is a perspective view of a receiving structure with two weighing modules which have parallel-guiding diaphragm springs arranged above and below the force-measuring cell, also indicating the design spaces of the weighing modules.

In a perspective view, FIG. 1 shows a receiving structure 50 with two weighing modules 51A, 51B according to the invention, which form a device for the weighing of objects of a uniform nature. Each weighing module 51A, 51B includes, respectively, a force-measuring cell 52A, 52B with a load receiver 53A, 53B. Each of these weighing modules 51A, 51B is arranged within a design space 54A, 54B. The dimensions of the respective design space in a plane that is orthogonal to the direction of the load are delimited by the design spaces of adjacent force-measuring cells and/or are equal to the largest dimensions of the force-measuring cell 52A, 52B in said plane within the respective design space 54A, 54B.

The dimension in the direction of the load is delimited for example by a housing floor which is solidly connected to the receiving structure, or by a base plate 134. In the direction against the load vector, the design spaces 54A, 54B are delimited for example by the tops of the load receivers 53A, 53B, for example for the reason that the area above the load receivers 53A, 53B is normally occupied by the operating space of a conveyor system which is not shown in the drawing.

The weighing module 51A is solidly connected to the receiving structure 50 through fastener means 55, for example screws. The force-measuring cell 52A of the weighing module 51A includes a coil, arranged inside the force-measuring cell 52A and not shown in the drawing, which is connected to a force-transmitting rod 56A which traverses the force-measuring cell 52A in the direction of the load. Attached to the upper end of the force-transmitting rod 56A is the load receiver 53A.

Arranged between the load receiver 53A and the force-measuring cell 52A is an upper parallel-guiding diaphragm 57A, whose upper parallel-guiding member 58A connects the upper movable parallel leg 59A to the upper stationary parallel leg 60A with a prescribed guiding distance.

Guiding distance, as the term is used here, means the direct distance between the movable parallel leg 59A and the stationary parallel leg 60A of the parallel-guiding diaphragm 57A. With regard to this guiding distance, it is irrelevant how the parallel-guiding member 58A connecting the two legs is configured.

However, the parallel-guiding member 58A is shaped so that its effective length is significantly greater than the guiding distance of the parallel-guiding diaphragm 57A. The effective length is defined as the actual stretched-out length, more specifically the length of the stress-neutral fiber (with regard to bending stress) of the parallel-guiding member 58A including its connecting areas with the parallel legs 59A and 60A.

The upper movable parallel leg 59A is connected to the force-transmitting rod 56A, and the upper stationary parallel leg 60A has a fixed connection to the force-measuring cell 52A. On the side that faces away from the load receiver 53A the force-measuring cell 52A has likewise a lower parallel-guiding diaphragm 61A whose lower parallel-guiding member 62A connects the lower movable parallel leg 63A to the lower stationary parallel leg 64A, as shown in the break-away drawing of the force-measuring cell 52A in FIG. 1. The lower movable parallel leg 63A is likewise connected to the force-transmitting rod 56A, and the lower stationary parallel leg 64A is likewise secured to the force-measuring cell 52A.

The effective length of the upper parallel-guiding member 58A should be identical to the effective length of the lower parallel-guiding member 62A, as it would hardly be possible otherwise to achieve a precisely guided parallel movement of the force-transmitting rod 56A.

The description of the weighing module 51A analogously applies to the weighing module 51A, its upper parallel-guiding diaphragm 57B and lower parallel-guiding diaphragm 61B.

For a problem-free exchange of weighing modules 51A, 51B arranged side-by-side in a device for the weighing of articles of a uniform nature, no part of a weighing module 51A that is to be exchanged may protrude beyond the boundaries of its design space 54A. The movable parallel leg 59A therefore needs to be arranged within the design space 54A. In the extreme case, the outside contour of the movable parallel leg 59A, the parallel-guiding member 58A or the stationary parallel leg 60A can be equal to the outside contour of the design space cross-section orthogonal to the direction of the load.

Of course, this arrangement is not limited to two weighing modules 51A, 51B. Any number of weighing modules can be arranged behind each other and side-by-side in a two-dimensional layout, wherein any two neighboring force-measuring cells are grouped together in the manner illustrated.

Figure 2:
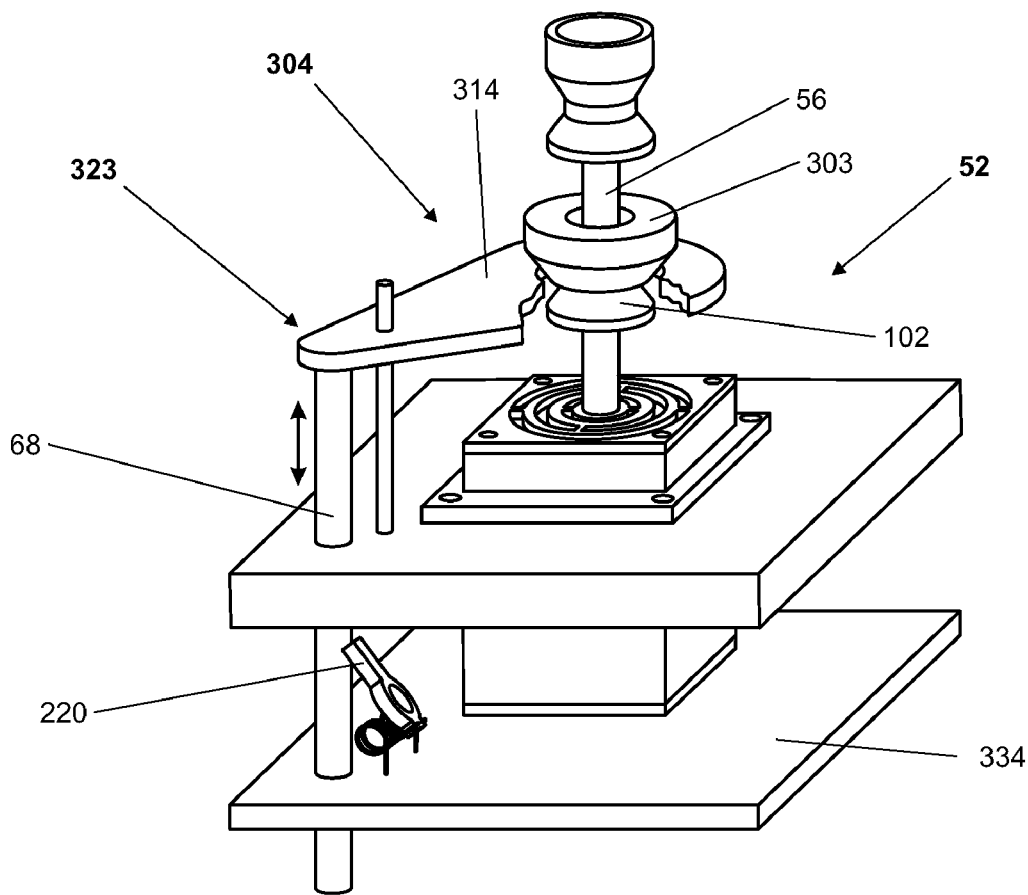
FIG. 2 is a perspective view of a force-measuring cell of small dimensions perpendicular to the direction of the load, with a calibration weight arrangement for one calibration weight.

FIG. 2 shows a weighing module with a force-measuring cell 52 of small dimensions, specifically in the projection into a plane that is orthogonal to the direction of the load. A force-measuring cell 52 of this kind can for example have a square profile in the plane that is orthogonal to the direction of the load, measuring a few centimeters along the edges. Of course, round or rectangular profiles are also conceivable. The force-measuring cell 52 in FIG. 2 is illustrated with a calibration weight arrangement 304 specially designed for it. With this calibration weight arrangement 304 it is possible for example in a compound arrangement of force-measuring cells to calibrate each individual force-transmitting device of these force-measuring cells individually. The calibration weight arrangement 304 is distinguished by the fact that a pusher finger 220 moves the lifting element 323 up and down directly by periodically engaging and releasing a frictional contact with a traveling rod 68 which is a part of the lifting element 323 and of the actuator.

The transfer mechanism has a plate-shaped calibration weight seat 314. The ring-shaped calibration weight 303 is transferred by the transfer mechanism from the rest position to the calibrating position and back again from the calibrating position to the rest position.

Formed on or fastened to the force-transmitting rod 56A is a calibration weight carrier 102 which in this case is likewise ring-shaped. In the calibrating position as illustrated in FIG. 2, the calibration weight 303 is in force-transmitting contact with the calibration weight carrier 102. Ideally, the calibration weight 303 and/or the calibration weight carrier 102 have positioning means whereby the calibration weight 303 is correctly positioned relative to the calibration weight seat 302 and relative to the transfer mechanism.

Figure 3:
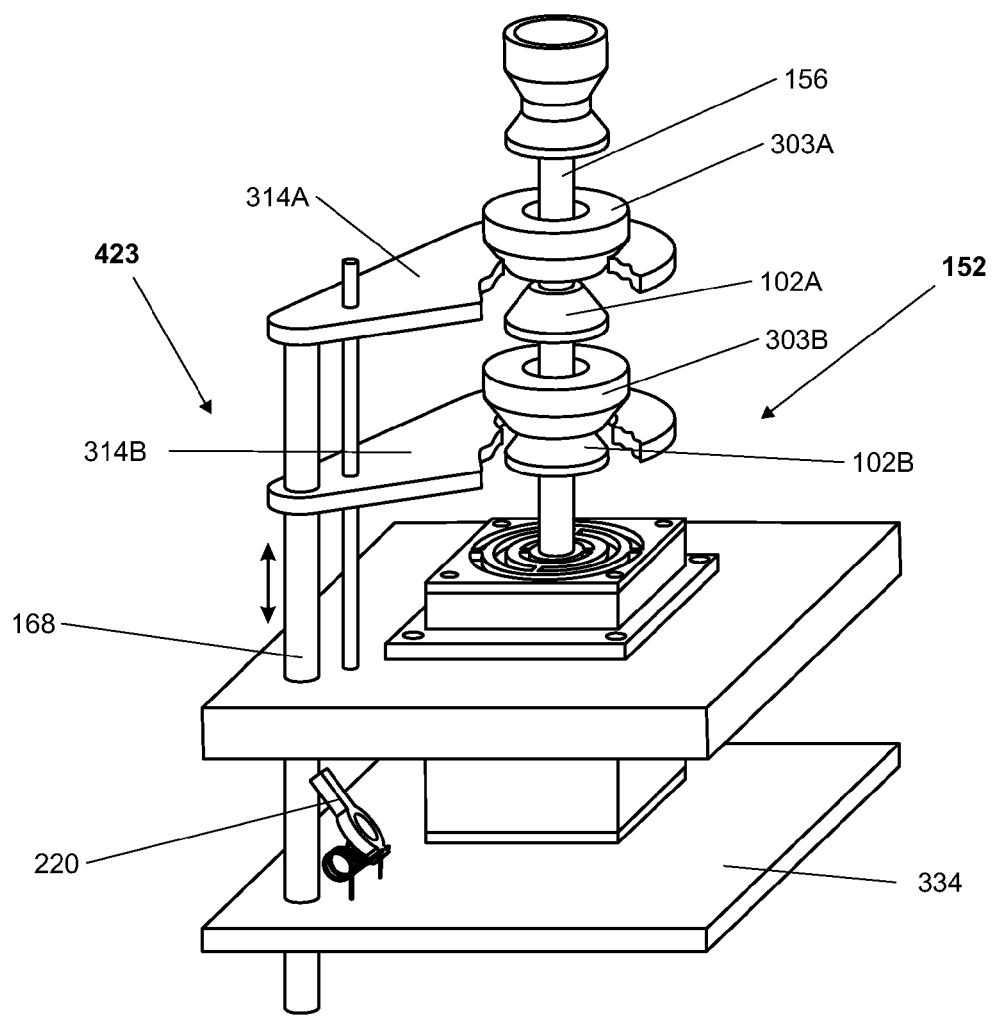
FIG. 3 is a perspective view of a force-measuring cell of small dimensions perpendicular to the direction of the load, with a calibration weight arrangement for two calibration weights.

FIG. 3 illustrates that the calibration weight arrangement described in FIG. 2 is also suitable for the lifting and lowering of two calibration weights 303A, 303B. This is particularly useful if linearity errors are to be measured. In making such measurements, it is not necessarily required for the calibration weights 303A, 303B to be of equal mass. The calibration weight arrangement of the force-measuring cell 152 has two plate-shaped calibration weight seats 314A, 314B. As may be seen in FIG. 3, the calibration weight 303B is resting on the calibration weight carrier 102B and is therefore in calibrating position, while the calibration weight 303A is in contact with the calibration weight seat 314A. By lowering the two plate-shaped calibration weight seats 314A, 314B farther, the calibration weight 303A will likewise come into contact with its calibration weight carrier 102A.

The lifting and lowering of the lifting element 423 is accomplished by the combined action of the piezoelectric drive mechanism which is mounted on the base plate 334 and the traveling rod 168, wherein the pusher finger 220 forms an actuator which engages the traveling rod 168 with a periodic, or repetitively pulsating, frictional contact force. The direction of movement is reversible with this type of drive mechanism, which means that the upward- and downward movements are accomplished by the same elements.

It should be noted here that, deviating from FIGS. 2 and 3, the drive mechanism as well as the transfer mechanism could also be arranged below or above the force-measuring cell, within the design space as defined in FIG. 1. For example, with an embodiment of the force-measuring cell 52A according to FIG. 1, the force-transmitting rod 56A could be extended in the downward direction and equipped with a ring-shaped calibration weight carrier. A likewise ring-shaped calibration weight is, in its calibrating position, in contact with the calibration weight carrier and rests, in its rest position, on a fork-like calibration weight seat which is arranged for example directly on the traveling element of a piezoelectric drive mechanism.

Figure 4:
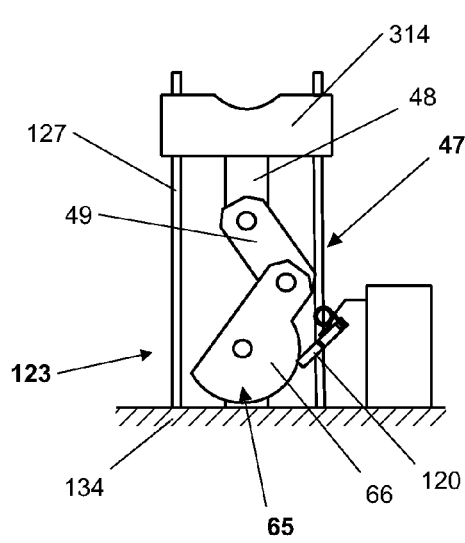
FIG. 4 is a schematic side view of a transfer mechanism with a lifting element configured as a knee-lever element.
Figure 5:
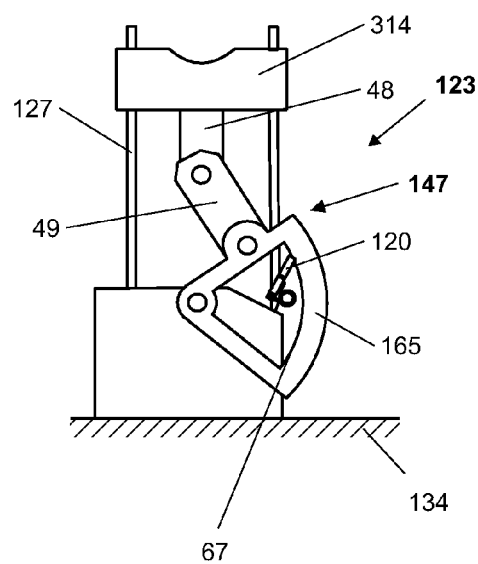
FIG. 5 is a schematic side view of a further transfer mechanism with a lifting element configured as a knee-lever element.

Design configurations of the greatest diversity are conceivable for the lifting element of a calibration weight arrangement. Among these are concepts that are known from the prior art and will therefore only be mentioned in passing here, including arrangements of wedges moving in opposition to each other, or eccentrics on which a calibration weight seat with or without a guide platform is riding. FIGS. 4 and 5 show two further embodiments of lifting elements 123 in the form of different knee lever elements 47, 147 which are actuated directly by the pusher finger 120 of the drive mechanism containing a piezoelectric element.

FIG. 4 represents in a schematic side view a calibration weight seat 314 which is vertically movable along two guide posts 127. The lifting element 123 has a disk-shaped knee lever element 47 whose first part 49 is pivotally connected to a leg 48 that is connected to the calibration weight seat 314. The first part 49 of the knee lever element 47 is likewise pivotally connected to a second part 65. The latter is connected to a foundation, for example to the base plate 134, again through a pivotal joint. The second part 65 includes a portion with a semicircular convexity 66 whose outside surface is engaged by a pusher finger 120 of a drive mechanism as described above. This has the effect that the semicircular convexity 66 is moved along the point of engagement of the pusher finger 120; the knee lever element 47 straightens or bends, whereby the calibration weight seat 314 is moved in the vertical direction.

In a representation analogous to FIG. 4, FIG. 5 shows a further embodiment of a knee lever element 47, where the second part 165 of the knee lever element 147 is configured as a disk-shaped frame with an internal surface profile 67 shaped like a part of a circle. The pusher finger 120 acts on the inside of the frame, and the internal surface profile moves along the point of engagement of the pusher finger 120, whereby the knee lever element 147 is caused to straighten or bend so that the calibration weight seat 314 is moved in the vertical direction.

Figure 6:
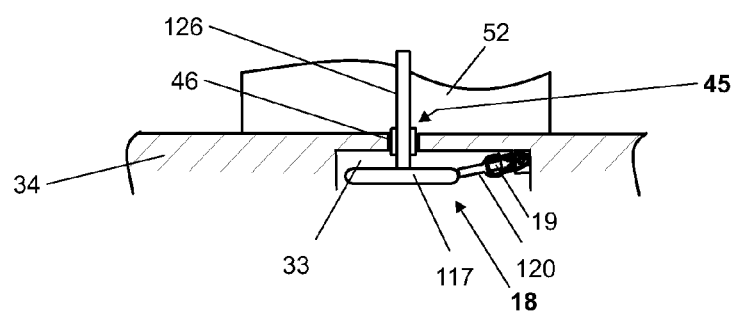
FIG. 6 is a schematic cross-sectional view of an enlarged detail of a base plate in which an actuator is arranged.

Since a drive mechanism with a piezoelectric element generates heat during operation, which is undesirable in the space occupied by the force-measuring cell of a balance, the drive mechanism in an embodiment of the force-measuring cell as shown schematically in FIG. 6 as an enlarged detail of FIG. 1 is installed in a recess 33 of the base plate 34 on which the force-transmitting mechanism is arranged. The part of the base plate 34 which remains between the drive wheel 117 of the actuator and the guide platform 16 has an opening 45 through which the shaft 126 passes. The opening 45 contains a bearing 46 which constrains the shaft 126. Thus, the excess heat is carried off through the base plate 34 and, if applicable, through a housing that is connected to the base plate. This arrangement has the further advantage that abraded matter which may possibly be produced by the friction between the pusher finger 120 and the drive wheel 117 originates outside of the space containing the force-measuring cell and therefore does not contribute to the contamination of the latter. According to a further variation, the drive mechanism is accommodated in a recess of the base plate which is open from above.

As is self-evident, a multitude of drive mechanisms which include at least one piezoelectric element could be used here. Examples that may be mentioned include a traveling wave motor, an ultrasonic motor with a ring-shaped piezo element, a linear piezoelectric drive, or a so-called caterpillar drive.

Since the drive mechanism with a piezoelectric element is self-locking, which means that when the current is switched off the traveling element is kept immobilized in its current place, the position occupied at that time by the calibration weight seat is secured without requiring any further action.

The drive mechanism can in particular be equipped to perform a sensor function to monitor the proper functioning of the transfer mechanism. The monitoring of the current for activating the piezoelectric element or of the inductivity of the feedback loop can be used for example to determine the position of the lifting element and the calibration weight.

Calibration arrangements of the kind presented herein can be used in balances of high resolution as well as in balances with a lower level of resolution.

What is claimed is:

1. A force-measuring cell for installation in a receiving structure, as one of a plurality of the same type of force-measuring cells, each force-measuring cell having a force-transmitting device that defines a load direction, such that each force-measuring cell occupies a design space in the receiving structure, each design space having dimensions, projected into a plane extending orthogonal to the load direction, that are delimited by the design spaces of adjacent force-measuring cells and/or correspond to the largest dimension of the force-measuring cell in the plane, each force-measuring cell comprising:
   parallel-guiding diaphragms arranged on upper and lower surfaces of the force-measuring cell; and
   a calibration weight arrangement, comprising:
      a calibration weight which can be coupled to the force-measuring cell;
      a drive mechanism, comprising:
         an actuator, having at least two elements which interact with each other through the repeated engagement and release of a frictional contact force which occurs during a travel movement in one direction; and
         a piezoelectric element that drives the actuator; and
      a transfer mechanism, co-acting with the actuator for the guided movement of the calibration weight.

2. The force-measuring cell of claim 1, further comprising:
   a lifting element;
   a calibration weight seat; and
   a guiding device;
   each of which is a part of the transfer mechanism.

3. The force-measuring cell of claim 2, wherein:
   the calibration weight seat is immobilized by self-locking of the drive mechanism when no current is flowing in the drive mechanism.

4. The force-measuring cell of claim 1, further comprising:
   a linear motor, including a piezoelectric element and a traveling element, the linear motor being a part of the transfer mechanism.

5. The force-measuring cell of claim 4, wherein:
   the calibration weight seat is arranged directly on the traveling element.

6. The force-measuring cell of claim 2, further comprising:
   a rotary piezoelectric motor, in particular a traveling wave motor or a motor that is equipped with a ring-shaped piezo element, the rotary piezoelectric motor having a shaft with a spindle incorporated therein,
   wherein the rotary piezoelectric motor is a part of the drive mechanism and the lifting element performs a vertical movement by means of the spindle.

7. The force-measuring cell of claim 1, wherein:
   the piezoelectric element comprises a means for sensing the proper functioning and/or the actual position of the transfer mechanism.

8. The force-measuring cell of claim 1, further comprising:
   a pusher finger which is moved on an elliptic path by the piezoelectric element; and
   a drive wheel, which periodically contacts the pusher finger as the pusher finger moves on the elliptic path, in the sense of a frictional or form-fitting connection.

9. The force-measuring cell of claim 8, further comprising:
   a shaft with an external thread, the shaft rotatable through the actuator; and
   a guide platform with an internal thread, positioned for movement along the shaft.

10. The force-measuring cell of claim 2, wherein:
    the lifting element is configured as an eccentric or as a pair of wedges moving in opposition to each other.

11. The force-measuring cell of claim 2, wherein:
    the lifting element is configured as a knee lever element.

12. The force-measuring cell of claim 11, further comprising:
    disk-shaped elements that are pivotally connected to each other, one of the disk-shaped elements comprising a semicircular convexity whose external surface is engaged by a pusher finger, the disk-shaped elements forming a part of the transfer mechanism.

13. The force-measuring cell of claim 11, wherein:
    the knee lever element comprises disk-shaped elements that are pivotally connected to each other, with one of the elements configured as a disk-shaped frame with an internal surface profile shaped as a circular arc, and the internal surface profile is adapted for engagement by a pusher finger.

14. The force-measuring cell of claim 1, further comprising:
    a base plate, on which the force-transmitting device is arranged, the base plate having a recess in which the drive mechanism is arranged.

15. The force-measuring cell of claim 14, wherein:
    the base plate has a reduced thickness in the area of the recess and an opening for the passage of at least a part of the lifting element.

16. The force-measuring cell of claim 2, further comprising:
    a pusher finger, moved on an elliptic path by the piezoelectric element, such that, while moving on the elliptic path, the pusher finger is periodically brought into direct contact with at least one of the lifting element and the calibration weight seat.

17. The force-measuring cell of claim 1, wherein:
    the drive mechanism and the transfer mechanism are arranged below or above the force-measuring cell within the design space thereof.

18. A weighing device, comprising:
a force-measuring cell according to claim 1.

19. The device of claim 18, further comprising:
a further force-measuring cell according to claim 1, the calibration weight arrangement of each force-measuring cell individually actuatable.

20. The device of claim 19, further comprising:
a structure for receiving the force-measuring cells, the receiving structure arranging the force-measuring cells in a two-dimensional matrix or a two-dimensional array.

* * * * *